(12) United States Patent
Tanne et al.

(10) Patent No.: US 9,092,523 B2
(45) Date of Patent: Jul. 28, 2015

(54) METHODS OF AND SYSTEMS FOR SEARCHING BY INCORPORATING USER-ENTERED INFORMATION

(75) Inventors: Michael Tanne, Los Altos, CA (US); Yunshan Lu, Milpitas, CA (US); Bruce D. Karsh, Half Moon Bay, CA (US)

(73) Assignee: SEARCH ENGINE TECHNOLOGIES, LLC, Los Altos, CA (US)

(*) Notice: Subject to any disclaimer, the term of this patent is extended or adjusted under 35 U.S.C. 154(b) by 0 days.

(21) Appl. No.: 11/364,617

(22) Filed: Feb. 27, 2006

(65) Prior Publication Data

US 2006/0271524 A1 Nov. 30, 2006

Related U.S. Application Data

(60) Provisional application No. 60/657,371, filed on Feb. 28, 2005.

(51) Int. Cl.
*G06F 17/30* (2006.01)

(52) U.S. Cl.
CPC .... *G06F 17/30864* (2013.01); *G06F 17/30648* (2013.01)

(58) Field of Classification Search
CPC .............. G06F 17/30864; G06F 17/3053
USPC ............................................. 707/706
See application file for complete search history.

(56) References Cited

U.S. PATENT DOCUMENTS

| | | | |
|---|---|---|---|
| 5,835,712 A | 11/1998 | DuFresne | |
| 5,991,735 A | 11/1999 | Gerace | |
| 6,029,195 A | 2/2000 | Herz | ............... 709/219 |
| 6,070,176 A | 5/2000 | Downs et al. | |
| 6,256,622 B1 | 7/2001 | Howard, Jr. et al. | ............... 707/3 |
| 6,324,566 B1 | 11/2001 | Himmel et al. | ............... 709/203 |
| 6,327,590 B1 | 12/2001 | Chidlovskii et al. | ............... 707/5 |
| 6,360,215 B1 | 3/2002 | Judd et al. | ............... 707/3 |

(Continued)

FOREIGN PATENT DOCUMENTS

| | | |
|---|---|---|
| JP | H09153051 | 6/1997 |
| JP | 2001052003 | 2/2001 |

(Continued)

OTHER PUBLICATIONS

Wee Meng Soon et al., "Corpus-Based Learning for Noun Phrase Coreference Resolution", DSO National Laboratories, pp. 285-291.

(Continued)

*Primary Examiner* — Noosha Arjomandi
(74) *Attorney, Agent, or Firm* — Haverstock & Owens LLP

(57) ABSTRACT

A system for and a method of using user-entered information to return more meaningful information in response to Internet search queries are disclosed. A method in accordance with the present invention comprises managing a database in response to multiple user inputs and displaying search results from the database in response to a search query. The search results include a results list and supplemental data related to the search query. Managing the database includes, among other things, re-ranking elements in the results list, storing information related to relevancies of elements in the results list, blocking a link in the results list, storing links to documents related to the search query, or any combination of these. The supplemental data include descriptions of or indices to one or more concepts related to the search query.

51 Claims, 4 Drawing Sheets

(56) References Cited

U.S. PATENT DOCUMENTS

| | | | |
|---|---|---|---|
| 6,601,075 B1 | 7/2003 | Huang et al. ............... | 707/104.1 |
| 6,714,929 B1 | 3/2004 | Micaelian et al. | |
| 6,718,365 B1 | 4/2004 | Dutta ........................... | 709/203 |
| 6,775,664 B2 | 8/2004 | Lang et al. ......................... | 707/3 |
| 6,823,491 B1 | 11/2004 | McBrearty et al. ........... | 715/513 |
| 6,829,599 B2 | 12/2004 | Chidlovskii | |
| 7,188,117 B2 | 3/2007 | Farahat et al. ................. | 707/101 |
| 7,283,997 B1* | 10/2007 | Howard et al. ...................... | 1/1 |
| 7,333,943 B1* | 2/2008 | Charuk et al. ............... | 705/26.1 |
| 7,363,593 B1* | 4/2008 | Loyens et al. ................ | 715/853 |
| 7,395,259 B2* | 7/2008 | Bailey et al. .......................... | 1/1 |
| 7,590,619 B2* | 9/2009 | Hurst-Hiller et al. .................. | 1/1 |
| 7,756,855 B2 | 7/2010 | Ismalon | |
| 7,890,501 B2 | 2/2011 | Lunt et al. | |
| 8,375,048 B1 | 2/2013 | Wad et al. | |
| 2002/0120609 A1* | 8/2002 | Lang et al. ......................... | 707/1 |
| 2002/0129014 A1 | 9/2002 | Kim et al. ......................... | 707/5 |
| 2002/0156779 A1* | 10/2002 | Elliott et al. ...................... | 707/6 |
| 2002/0165856 A1* | 11/2002 | Gilfillan et al. .................... | 707/3 |
| 2003/0041054 A1 | 2/2003 | Mao et al. ......................... | 707/3 |
| 2003/0078914 A1 | 4/2003 | Witbrock | |
| 2003/0161285 A1* | 8/2003 | Tiedemann et al. .......... | 370/332 |
| 2003/0212663 A1* | 11/2003 | Leno et al. ......................... | 707/3 |
| 2004/0024755 A1* | 2/2004 | Rickard ........................... | 707/3 |
| 2004/0030697 A1* | 2/2004 | Cochran et al. ................... | 707/9 |
| 2004/0068486 A1 | 4/2004 | Chidlovski et al. | |
| 2004/0117354 A1 | 6/2004 | Azzaro et al. | |
| 2004/0215608 A1 | 10/2004 | Gourlay | |
| 2004/0254917 A1 | 12/2004 | Brill et al. | |
| 2005/0033771 A1 | 2/2005 | Schmitter et al. .......... | 707/104.1 |
| 2005/0071325 A1 | 3/2005 | Bem | |
| 2005/0071328 A1 | 3/2005 | Lawrence | |
| 2005/0131866 A1 | 6/2005 | Badros et al. | |
| 2005/0149473 A1 | 7/2005 | Weare | |
| 2005/0149499 A1* | 7/2005 | Franz et al. ........................ | 707/3 |
| 2005/0234972 A1 | 10/2005 | Zeng et al. | |
| 2005/0289120 A9* | 12/2005 | Soulanille et al. ................. | 707/3 |
| 2006/0047643 A1* | 3/2006 | Chaman ............................ | 707/3 |
| 2006/0136377 A1* | 6/2006 | Patt-Shamir et al. ............. | 707/3 |
| 2006/0173880 A1* | 8/2006 | Alberts et al. ................. | 707/101 |
| 2006/0242139 A1 | 10/2006 | Butterfield et al. | |
| 2007/0011154 A1 | 1/2007 | Musgrove et al. | |
| 2007/0106659 A1 | 5/2007 | Lu et al. ............................ | 707/5 |
| 2007/0112761 A1 | 5/2007 | Xu et al. | |
| 2007/0185858 A1 | 8/2007 | Lu et al. ............................ | 707/5 |
| 2007/0287473 A1* | 12/2007 | Dupray ....................... | 455/456.1 |
| 2008/0109881 A1 | 5/2008 | Dasdan | |
| 2009/0089272 A1 | 4/2009 | Oliver et al. | |
| 2009/0144264 A1* | 6/2009 | Singh et al. ......................... | 707/5 |

FOREIGN PATENT DOCUMENTS

| | | | | |
|---|---|---|---|---|
| JP | 2001-350794 | | 12/2001 | |
| JP | 2002334107 A | | 11/2002 | |
| JP | 2004-013323 | | 1/2004 | |
| KR | 1020020015383 | | 3/2002 | |
| TW | 530224 | | 5/2003 | |
| TW | 548557 | | 8/2003 | |
| TW | 200422878 | | 11/2004 | |
| WO | WO 99/66427 | | 12/1999 | ............. G06F 17/30 |
| WO | WO99/66427 | | 12/1999 | |
| WO | 2004097568 | | 11/2004 | |
| WO | 2004097568 A2 | | 11/2004 | |

OTHER PUBLICATIONS

Julian Kupiec et al., "A Trainable Document Summarizer", Xerox Palo Alto Research Center, 6 pages.

Hwee Tou Ng et al., "A Machine Learning Approach to Answering Questions for Reading Comprehension Tests", DSO National Laboratories, pp. 124-132.

Lynette Hirschman et al., "Deep Read: A Reading Comprehension System", The MITRE Corporation, pp. 325-332.

Stephen Soderland, "Learning Information Extraction Rules for Semi-Structured and Free Text", Machine Learning, 34, 233-272 (1999).

Jimin Liu et al., "Building Semantic Perceptron Net for Topic Spotting", School of Computing, National University of Singapore, 8 pages.

Yiming Yang et al., "A Comparative Study on Feature Selection in Text Categorization", 9 pages.

Richard M. Tong et al., "Conceptual Information Retrieval using RUBRIC", Advanced Decision Systems, pp. 247-253.

K. Sparck Jones et al., "A probabilistic model of information retrieval: development and status", Computer Laboratory, University of Cambridge, Aug. 1998, pp. 1-74.

Gerard Salton, "Dynamic Document Processing", Communications of the ACM, 15(7), 658-668 (1972).

Sergey Brin et al., "The Anatomy of a Large-Scale Hypertextual Web Search Engine", Computer Science Department, Stanford University, pp. 1-26.

Yiming Yang et al., "A re-examination of text categorization methods", Proceedings of SIGIR '99. pp. 42-49.

Steve Lawrence & C. Lee Giles, "Accessibility of information on the web", Nature, 400(8), Jul. 1999, pp. 107-109.

Claire Cardie "Empirical Methods in Information Extraction", AI Magazine, 18(4), 1997, pp. 65-79.

Final Office Action dated Mar. 17, 2006, U.S. Appl. No. 11/378,756, filed Mar. 17, 2006, Yunshan Lu.

Advisory Action dated May 21, 2010, U.S. Appl. No. 11/378,756, filed Mar. 17, 2006, Yunshan Lu.

Non-Final Office Action dated Sep. 1, 2010, U.S. Appl. No. 11/378,756, filed Mar. 17, 2006, Yunshan Lu.

Vladimir Eske "User Profile Management in a Web Search Engine", Computer Science Department Saarland University, Jun. 2004, pp. 1-123.

Search Report and Preliminary Opinion, European Patent Office, dated Sep. 6, 2010, European Patent Application No. 06738810.8, Search Engine Technologies, LLC.

Notification of Examination, Taiwan Intellectual Property Office, dated Sep. 23, 2010, Taiwan Patent Application No. 095109496, Wink Technologies.

Foreign Office Action, China Patent Office, dated Jul. 6, 2011, China Patent Application No. 200680013556.8, Filed Feb. 28, 2006.

Office Action dated Mar. 23, 2011, U.S. Appl. No. 11/378,756, filed Mar. 17, 2006, Yunshan Lu.

Foreign Office Action, Japan Patent Office, dated May 11, 2011, Japan Patent Application No. 2007-558198, Filed Aug. 28, 2007.

Foreign Office Action, Japan Patent Office, dated May 12, 2011, Japan Patent Application No. 2008-502111, Filed Sep. 18, 2007.

Yu Suzuki, An Automatic Selection Method of Integration Function, Technical Report of IEICE, Japan, The Institute of Electronics, Information and Communication Engineers, Jul. 7, 2004, vol. 104, No. 177, pp. 195-200.

Advisory Action dated Jun. 7, 2011, U.S. Appl. No. 11/378,756, filed Mar. 17, 2006, Yunshan Lu.

Foreign Office Action; China State Intellectual Property Office, dated Mar. 2, 2011, Chinese Patent Application No. 200680013556.8, Filed Feb. 28, 2006.

Office Action mailed Jan. 24, 2013, U.S. Appl. No. 13/474,628, filed May 17, 2012, Yunshan Lu et al.

Japan Office Action mailed Feb. 3, 2012, Japan Application No. 2007558198, 3 pages.

Korea Office Action mailed Aug. 22, 2012, Korea Application No: 10-2007-7019690, 14 pages.

China Office Action mailed Apr. 25, 2012, China Application No. 200680013556.8, 7 pages.

Seji Yamada et al., Acquiring Meta Information Resource in the WWW, Journal of the Japanese Society for Artificial Intelligence, The Japanese Society for Artificial Intelligence, Mar. 1, 2005, vol. 20, No. 2, pp. 149-156.

English-language translation of Office Action, Japanese Patent Application No. 2008-502111, mailed Oct. 8, 2013, pp. 1-5.

Tripadvisor.com Web site, searching for keywords "Paris", Aug. 18, 2004 from http://web.archive.org/web/20040818035209/http://www.tripadvisor.com/Tourism-g187147-Paris_lle_de_France-Vacations.html (Aug. 18, 2004) (pp. 1-3).

(56) References Cited

OTHER PUBLICATIONS

Eske,Vladimir, User Profile Management in a Web Search Engine, Computer Science Department Saarland University, Jun. 20014 https://domino.mpi-inf.mpg.de/intranet/ag5/ag5publ.nsf/a07d7d3a286130d0c12565dd006fb8e2/983fc84653920a97c1256ede00394b65/$FILE/Eske.pdf.

Girma, Antheneh B., Non-Final Office Action, U.S. Appl. No. 11/378,756, mailed Aug. 17, 2009, 33 pages.

Foreign Office Action, China Patent Agent (H.K) Ltd., Patent Application No. 200680013556.8, Application Filing Date: Feb. 28, 2006, Issue date of the Office Action: Aug. 14, 2009, pp. 1-13.

* cited by examiner

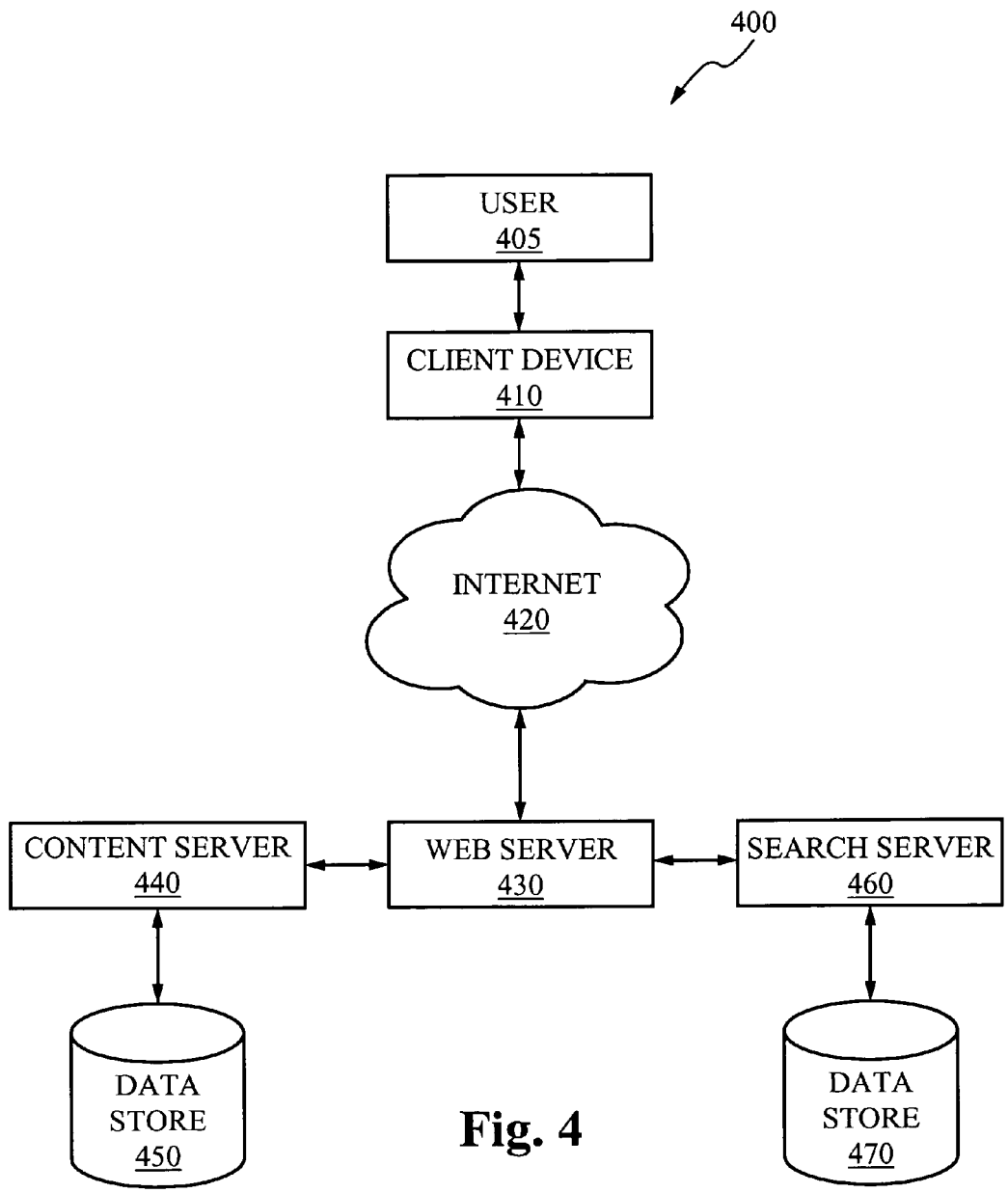

METHODS OF AND SYSTEMS FOR SEARCHING BY INCORPORATING USER-ENTERED INFORMATION

RELATED APPLICATION

This application claims priority under 35 U.S.C. §119(e) of the U.S. provisional application Ser. No. 60/657,371, filed on Feb. 28, 2005, and titled "Search Engine that Incorporates User-Entered Information," which is hereby incorporated by reference.

FIELD OF THE INVENTION

This invention relates to search engines. More specifically, this invention relates to systems for and methods of searching the Internet by incorporating user-entered information.

BACKGROUND OF THE INVENTION

Internet search engines are designed to locate desired information from among the vast amount of information contained across the Internet. Users describe the information they are looking for by entering queries containing search terms. The search engine matches the search terms against an index of Web pages using a variety of relevance calculations with the objective of identifying those Web pages that are most likely related to the information sought by the users. The search engine then returns a ranked list of hyperlinks to these Web pages, with the links determined to be most relevant nearer the top of the list.

In order to use a search engine, each user must figure out for himself how to construct and enter a query that will cause the search engine to return a results list containing links to sources that will most likely provide the information the user is seeking. Traditionally, searching was done by search experts who were skilled at crafting elaborate and precise Boolean queries. This is a skill that is still in common use at places such as news organizations, libraries and the United States Patent Office. However, on the Internet, most users are unfamiliar with such techniques, and usually enter no more than a few words, with no particular logical expression, hoping the search engine will provide the information they are seeking.

Most search engines today have as an objective of their user interaction design to provide relevant search results without requiring precise queries, by factoring in other evidence about relevance. For example, search engines may analyze the hyperlinks between Web pages, or look for documents that contain terms that are semantically similar to the terms in the query, or demonstrate a high level of co-occurrence with terms in the query over the corpus of documents.

Results returned by search engines can also be manipulated. Web site owners can add content or meta data or hyperlinks from other Web sites to their Web site, so that their Web pages are listed near the top of results lists, even though the Web pages do not contain information that is highly related to a user's query. This practice is often referred to as Search Engine Optimization ("SEO").

Because search techniques have limits and because search engines cannot divine the intent of users in conducting searches, users are often unsatisfied or frustrated with the results returned by search engines. If the user happens to construct a query that yields satisfactory results, there is no mechanism by which he can share that query with other users who wish to do the same or a similar search. Likewise, there is no mechanism for users to review input from others as they attempt to construct queries that will cause the search engine to return the desired results. Search engines do not allow users to learn from one another, or to take advantage of successful searches conducted by one another.

The objective of search engines is not simply to provide lists of links to documents, but ultimately to provide access to the most relevant information to users in response to their queries. Conventional search engines provide primarily a ranked list of hyperlinks to Web pages that are determined by computer algorithms to be relevant. Users looking for answers to questions about a subject area must follow those hyperlinks and search around on those Web sites for the information they are seeking. Search engines do not return information about the subject, or direct answers to questions in addition to links to Web sites. When, for example, a user enters a query for "Calgary Alberta" the results page does not contain information such as: Location: Lat: 51' 1", Long: 114' 1" and Population: 922,315, in addition to a link to a "City of Calgary" Web page along with the conventional results list.

Additionally, search engines have a difficult time disambiguating between different concepts that can be described by the same query term. For example the query "star wars" may refer both to the movie "Star Wars" and to the Strategic Defense Initiative. Attempts have been made to develop algorithms such as clustering or semantic analysis in order to determine which concept a user is searching for when he enters a query, but so far with limited success. Often users have knowledge of the concept to which their query pertains. It would be advantageous if those users were able to enter this relevant information to help the search engine disambiguate between that concept and other related concepts. This information would also help other users to understand the concept and assist in the process of searching for information about the concept.

SUMMARY OF THE INVENTION

The present invention is directed to systems for and methods of receiving inputs from users of search engines to provide better search results to users of the system. In accordance with the present invention, a community of users is able to manage a database from which search results and other information related to searches are generated. Among other things, users are able to vote on the relevance of elements in a result list, add supplemental information such as links to related Web sites, and run other searches using user-entered and computer-generated search terms. In this way, search results are able to provide users with more relevant information.

In a first aspect of the present invention, a method comprises managing a database in response to multiple user inputs and displaying search results from the database in response to a first search query. Preferably, the search results include a results list and supplemental data related to the first search query. Managing the database includes any combination of re-ranking elements in the results list, storing information related to relevancies of elements in the results list, blocking a link in the results list, storing links to documents related to the first search query.

In accordance with the present invention, search results are able to be ranked in response to users providing feedback with regard to web pages they think are relevant, even if they provide this feedback outside of the context of a search, or even if they tag it a web page with terms other than the search query in the first search.

In one embodiment the supplemental data includes a description of a first concept related to the first search query. In one embodiment, managing the database includes any one of adding, editing, and deleting the description of the first concept. In other embodiments, the description of the first concept contains a link to a description of a second concept related to the first concept. In another embodiment, the supplemental data includes an index into a list of concepts related to one or both of the first concept and the second concept. The second concept is any one of a sub-category of the first concept, a co-occurrence of the first concept, and a concept whose occurrence is statistically related to occurrences of the first concept. A relationship between the first concept and the second concept is determined by selecting one of predetermined criteria, user-entered categories, and a statistical relationship.

In another embodiment, the supplemental data includes a link for automatically executing a second search query related to the first search query. A term of the second search query is either input by a user or is determined by a computer. The computer-determined term is derived from any one of its co-occurrence in a document containing a term of the first search query, its location within a document containing a term of the first search query, and a density of its occurrences in a document containing a term of the first search query. In one embodiment, the method also includes using a suspension criterion to suspend an ability of a user to provide user input data.

In a second aspect of the present invention, a method comprises submitting a query to a search engine, generating a search results list, retrieving supplemental information related to the query, and displaying a results page containing the search results list and the supplemental information. User input is used to modify at least one of the search results list and the supplemental information.

In a third aspect of the present invention, a method of displaying search results in relation to input from first and second users from among multiple users comprises generating first search results in response to a first query, receiving input from the first user, modifying a database in response to the input from the first user, receiving a second query related to the first query, and displaying to the second user second search results generated from the database.

In a fourth aspect of the present invention, a system comprises a Web server configured to display search results and supplemental information related to terms of a first search query; a search engine for querying a database and providing a search results list in response to user queries; and a content manager for managing the supplemental information in response to multiple user inputs. Preferably, the system also includes a first data store coupled to the content manager for storing the supplemental information.

In one embodiment, the content manager is configured to receive the multiple user inputs for updating the supplemental information. Preferably, the system also includes a display area for displaying the supplemental information. The supplemental information includes a description of a first concept related to the first search query. The supplemental information includes a link to a description of a second concept. In one embodiment, the content manager is configured to receive the multiple user inputs to add, edit, or delete the link. In another embodiment, the content manager is configured to receive the multiple users input to add, edit, or delete the description of the first concept.

In another embodiment, the system also includes an area that displays links for automatically executing a second search query related to the first search query. Preferably, the system also includes a search engine for organizing the search results based on the multiple user inputs. The search engine is configured to organize the search results based on the multiple user inputs by ranking the search results. The system also includes a user device for executing the Web server. The user device is one of a personal computer, a portable phone, and a personal digital assistant and is configured to communicate with the Web server using any one or more of HyperText Transfer Protocol and Wireless Application Protocol.

BRIEF DESCRIPTION OF THE DRAWINGS

FIG. 4 is a hardware diagram illustrating the components of an Internet search application in accordance with the present invention.

DETAILED DESCRIPTION OF THE PREFERRED EMBODIMENTS

Figure 1:
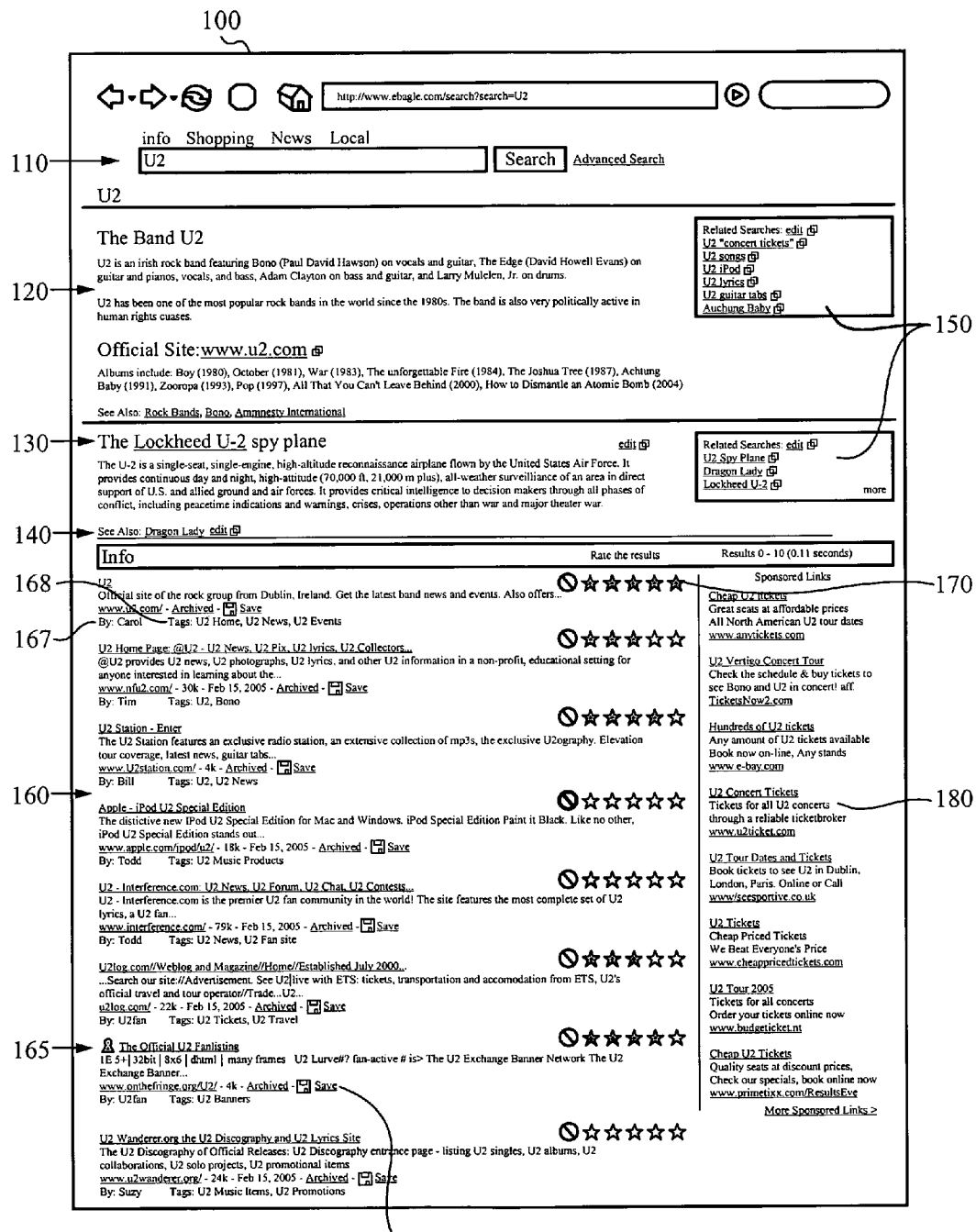
FIG. 1 is a schematic illustration of a graphical user interface displaying a list of search results incorporating user-entered information in accordance with the present invention.

Embodiments of the present invention, unlike traditional search engines, make use of supplemental information to provide more relevant information to users searching the Internet, more particularly where this supplemental information is user-entered. For example, in accordance with the present invention, a first user performing a search is able to add user-entered information about performing searches for information regarding a concept referenced by the query. The first user is able to enter (1) a description of a concept related to the query, (2) advice for performing a search relating to that concept, (3) "see also" hyperlinks to query terms associated with related concepts, (4) related or suggested query terms, (5) feedback on the relevance of the results to his search, or (6) any other information. Additionally some or all of this information can be generated by computer algorithms, Web crawlers or other technology. A second user performing a similar or related search is then able to view this supplemental information in addition to a results list provided by the search engine, thereby obtaining search results that are more likely most relevant to him. This second user is also able to add user-entered information. Both users are able to share information related to the subject of the search. A community of users is thus able to share information that helps users to quickly evaluate and more accurately use and provide search results.

A database includes a corpus of information used to supplement search results lists, search indices themselves, and any combination of these: data that users of a search find useful, a record of data entered by users of the search, such as by saving, rating, blocking, writing, editing, or deleting data. The database is spread among one or more data stores and systems. Also, as described below, the database is able to be managed in response to user inputs.

In accordance with other embodiments of the present invention, search results also include selected items for display including, but not limited to, (1) mechanisms for providing feedback on the relevance of links in the results list, (2) mechanisms for saving links that are able to be displayed on personal search pages or voting for relevant links, and (3) mechanisms for "blocking" links to Web pages that are unrelated to the search result or are offensive in nature. Other embodiments include displays and links to related search terms and sponsored links.

Throughout the following description, the term "search engine" refers to an apparatus (or programs running on general purpose computers) that take as input a query and return a results list of hyperlinks to electronic documents or Web pages. The search engine includes the index of documents in its corpus, the code and algorithms that determine the relevance of each document, and the graphical user interface that delivers the results list to the user.

Throughout the following description the term "query" refers to a set of terms submitted to the search engine whether typed, spoken, submitted through a "link" that already has embedded a set of search terms, or submitted by any other interface. A query can comprise a single word, multiple words, or phrases. The query can be phrased as a question (e.g., a "natural language" query), a loose set of terms, or a structured Boolean expression. Indeed, a query can comprise symbols or any other characters used by a search engine to search for electronic documents or Web pages containing or related to the search characters.

Throughout the following description, the term "Web site" refers to a collection of Web pages that are linked together and are available on the World Wide Web. The term "Web page" refers to a publication accessible over the World Wide Web from any number of hosts and includes, but is not limited to, text, video, images, music, and graphics.

Throughout the following description, the term "results list" refers to a list of hyperlinks that reference documents or Web Pages that are accessible using the Hypertext Transfer Protocol (HTTP) or any other protocol for accessing Web pages or other electronic documents, along with other associated information for each link, including, but not limited to, titles of the documents, summaries of the documents, links to cached copies of the documents, the date on which the documents were last indexed or last modified, images associated with or located within the documents, and information extracted from the documents.

As used herein, the term "document" is defined broadly, and includes, in addition to its ordinary meaning, computer files and Web pages, whether those pages are actually stored or are generated dynamically in response to a request to display. The term "document" is not limited to computer files containing text, but also includes computer files containing graphics, audio, video, and other multimedia data.

As described in greater detail below, a search engine takes a query entered by a user, and matches the search terms against an index of Web pages using a variety of relevance calculations with the objective of identifying those Web pages that are most likely related to the information sought by the users. The search engine then returns a ranked list of hyperlinks to these Web pages, with the links thought to be most relevant nearer the top of the list. In accordance with the present invention, a search engine returns a results list based on user input, and users have the ability to input information into the system to, for example, affect the order of the documents or links listed in the results list.

In accordance with the present invention, when a user is delivered a page containing a results list, he can choose to add supplemental information to the page, which will be visible to other users who subsequently access the search engine by entering a query which is the same, or similar.

FIG. 1 is a schematic illustration of a representative graphical user interface (GUI) displaying a results page 100 returned in response to a query in accordance with the present invention. The GUI allows users to add, edit and view descriptions about the concept or concepts relating to a query term and add, edit and view advice on how to search for information about the concept.

The results page 100 comprises a box 110 for inserting a query term, an area 120 for displaying a description for a concept related to the query term, an area 130 containing a description of a different concept relating to the query term, an area 140 containing "See also" links to concepts relating to other query terms, and an area 150 containing a list of links which will cause related query terms to be executed, and an area 180 of sponsored links. The results page 100 also includes an area 160 containing the results list returned by the search engine. The area 160 also contains mechanisms 170 for entering user feedback and mechanisms 190 for saving links associated with each result returned by the search engine. As described in more detail below, in a preferred embodiment the areas 120, 130, 140 and 150 are able to be edited, added to, or otherwise modified by a user to display information presented to other users performing the same or similar queries.

As shown in the example of FIG. 1, when a user enters the query term "U2" in the box 110 and requests a search, the results page 100 is returned to him. The area 120 displays a description of one concept related to the query term "U2", here a description of the band "U2", as entered by users. The area 130 shows descriptions of a different concept for the query "U2", here the U2 spy plane, as entered by users. The area 150 displays query terms for related searches that the user may also be interested in having the search engine execute, such as "U2 concert tickets" or "U2 ipod", as entered by users or derived by algorithms. The area 140 contains "see also" hyperlinks to concepts relating to other query terms, as entered by users or derived by algorithms, such as "Bono" for the concept of "U2 the band" or "Dragon Lady" for the concept of "U2 the spy plane."

The area 160 contains the results of the search as well as user feedback mechanisms 170. Using the user feedback mechanisms 170, a user is able to rate how well the corresponding Web page matched what he was looking for. In other words, if a first Web page listed in the area 160 contained relevant information about the rock band U2 sought by the user, then the user is able to use the user feedback mechanism 170 to rate the link with a high score (e.g., 5 stars). A second Web page devoted to the name of a clothing line called "U2", irrelevant to the concept sought by the user but listed in the area 160, can be rated with a low score (e.g., 1 star). In accordance with the present invention, when a later user also interested in the band "U2" searches with the query "U2", the results list returned to him contains the first Web page (ranked with 5 stars) closer to the top of the results list and the second Web page (ranked with 1 star) closer to the bottom of the results list, or not even listed at all. In this way, a user is presented with a results list having only the most relevant results listed first. A user sequentially visiting the sites in the results list has a greater chance of viewing sites most relevant to the concept he is seeking. The order of the items in the results list is thus based on user feedback, in addition to meta data and other information over which users have no input.

Users are able to add descriptions 120 about a concept relating to a query term, providing some background information about the concept referred to by the query or advice on how to search for information about that concept. Users are also able to modify, enhance or remove descriptions about the concept relating to a query term that have previously been added or modified by themselves or other users.

Users are able to add descriptions of additional concepts relating to a search term, even if other concepts have already been entered. For example, for the query term "star wars" a description of the concept of the movie "Star Wars" is able to be added, including such information as the plot, actors, and producer. Subsequently, users are able to click on a link 130, which allows them to add a description relating to the same query term "star wars", describing a different concept, for example "Strategic Defense Initiative or SDI".

In alternative embodiments, concepts added, modified, or deleted in accordance with the present invention are sub-categories (e.g., sub-topics) of one another, co-occur in documents, or occur in a statistically-related manner. For example, the concepts "Operating System" and "Linux" are a topic and a related sub-topic. Also, in alternative embodiments, concepts are determined to be related from pre-determined criteria, user-entered categories, and statistical calculations (e.g., how often the concepts appear together in a document).

Users are able to add hyperlinks or "see also" references 140 linking to concepts relating to different query terms. As one example, a user adds to the "See also" section of the concept of Star Wars the movie, a hyperlink to the concept of George Lucas the writer/producer for the query term "George Lucas". Users are able to modify, add, or delete "See also" references.

Users are able to add suggested queries for a concept that when clicked on, causes the query to be submitted to a search engine that returns a results page 100 containing a results list 160, with associated supplemental information 120, 140, and 150.

The search engine is also able to generate suggested query terms using a computer algorithm. For example, one such computer algorithm searches documents to determine terms that often appear in the same document (co-occur), within a predetermined distance from one another, or with a pre-determined density (i.e., occur at least a pre-determined number of times). The algorithm thus determines that the terms are related, and the search engine offers the query terms as suggestions. Alternatively, the computer algorithm keeps a list of query terms, such as synonyms or word variations, which are also suggested to the user.

Users are able to add or save links to documents they consider to be highly relevant to the concept. This can be done by manually entering the links or by clicking on a hyperlink or icon 190 marked "Save", or referred to by other terms such as "Bookmark", "Tag", or "Add to Favorites." Since different users will have different ideas about which sites are most relevant, algorithms in accordance with the present invention determine the order of the sites listed. In one embodiment, the algorithm uses a "democratic" process, such that the documents receiving the most "votes" (e.g., "saved" by the largest number of users) are placed higher in the results list.

If the link to a document that is "saved" also shows up in the results list generated by the search engine, then an icon 165 can be used to show that this link is also one that has been voted for by users. Also, below each search result is a "By" entry 167, which shows the name of the user who added the link so that it could be returned as part of the results list, and a "Tags" entry 168, which lists the terms that the user tagged the link with or that were generated by a previous search.

In accordance with the present invention, links to Web sites are able to be listed in two ways, either as two separate lists: (1) the results list (algorithmic) and the user-entered links or (2) integrated into one list, with the user-entered links marked with an icon as described above.

Two or more people are able to modify any of the information described herein. As one example, a first user writes and a second user modifies the work of the first. The first is able to either "revert" or re-edit the work of the second. If two or more people disagree about what information should be entered, they can communicate by some other means (e.g., a discussion forum, email, instant messenger) in order to resolve the conflict and agree on what the entry should say.

If any two or more users are unable to resolve their disagreement about what should be entered, they are able to take their differences to an "editor" who can resolve the disagreement. The "editor" is responsible for a number of subject areas and has the authority to settle disputes, add or remove information, and ultimately to remove users who refuse to cooperate.

If a user enters information that others revert repeatedly, it can be assumed that the user is not entering information that people want to have posted. For example, the user may be defacing or vandalizing the information in the subject area. A rule is able to be enforced that requires users who have had their entries reverted a predetermined number of times within a certain time period be suspended for some predetermined period of time. This rule is intended to reduce the amount of vandalism.

Users are able to enter any kind of information, beyond any of the specific types of information suggested here. As one example, for all actors, a link to their page at the Internet Movie Database (www.imdb.com) is entered. Or for cities, a link to the Weather.com page showing current temperature and weather conditions is entered. Or for a song, links to sites that sell the song, the lyrics, other songs by the artist, or even sites that plays some or all of the song are entered.

It will be appreciated that many modifications can be made in accordance with the present invention. For example, user-generated feedback can be read from a file rather than input by a user directly from a terminal. Moreover, while the results page 100 shows areas such as "See also" links 140, it will be appreciated that in accordance with the present invention, results pages containing user-entered information can be displayed with any combination of areas, including or in addition to those shown in FIG. 1. This information is used to make search results more comprehensive, accurate, and meaningful.

Figure 2:
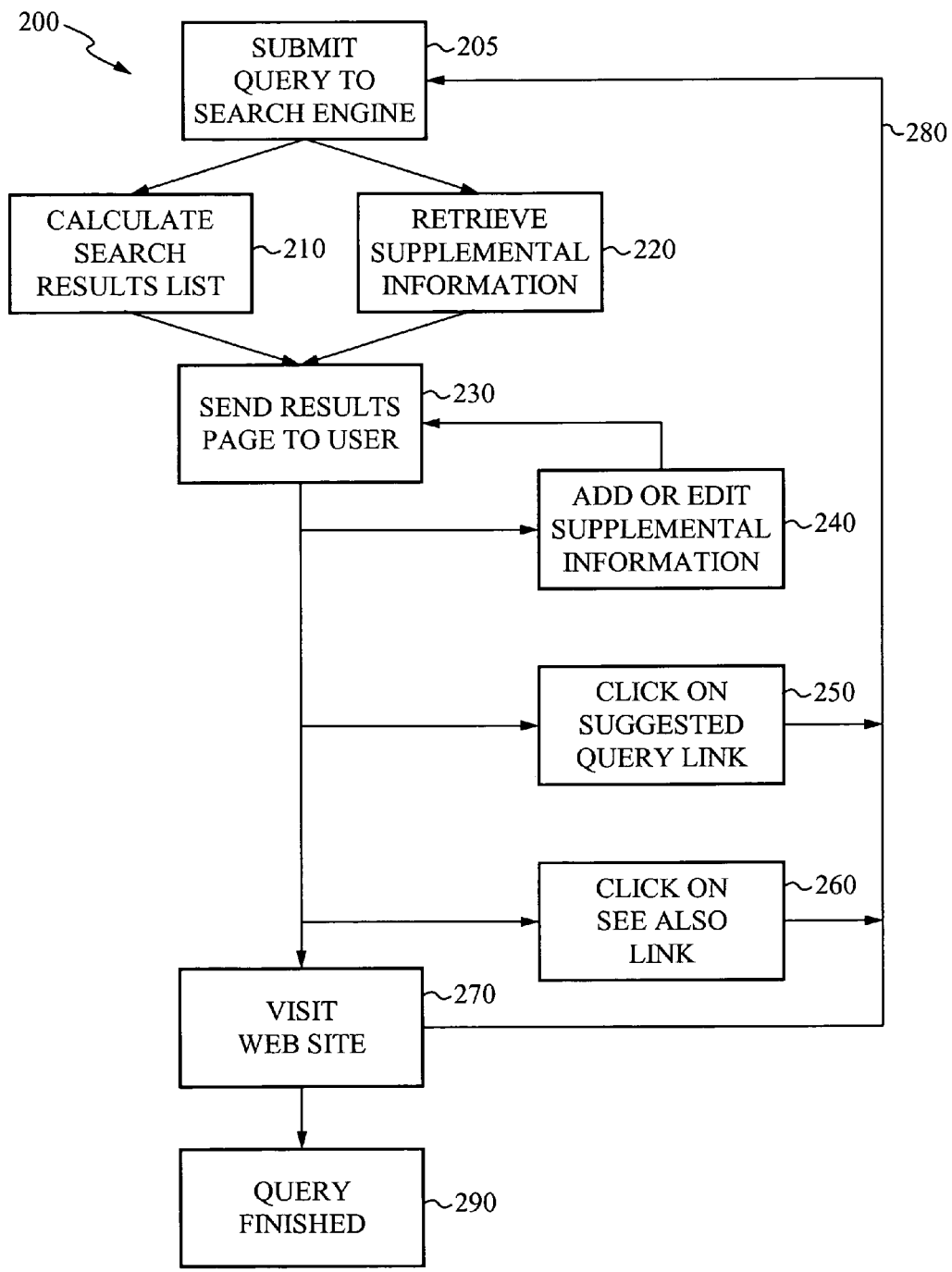
FIG. 2 is a flow diagram illustrating the operation of an Internet search application in accordance with the present invention.

FIG. 2 is a flow diagram illustrating the operation of an Internet search application 200 in accordance with one embodiment of the present invention. The Internet search application 200 provides the ability for users to input information to the system, thereby allowing other users to receive more meaningful search results based on the user input. The information is used to rank documents in a results list (e.g., re-rank the results initially returned by a search engine) generated in response to a specific query, or to add information that may be useful to users who perform the same or similar search. The results list is thus able to be "tuned" in response to user feedback to return more meaningful results, as well as to return additional information related to the subject matter of the query.

In the step 205, the user submits a query to a search engine. The process then continues to the steps 210 and 220 which are able to be performed simultaneously. In the step 210, the search results list is calculated, and in the step 220 the supplemental information (e.g., areas 120, 130, 140 and 150, FIG. 1) is retrieved. Both steps 210 and 220 proceed to the step 230, in which the results page (e.g., 100, FIG. 1) is sent to the user. The step 230 proceeds to any one of the steps 240, 250, 260, and 270.

In the step 240, the user is allowed to add to or edit the supplemental information (e.g., areas 120, 130, 140 or 150, FIG. 1). Alternatively, in the step 250, the user is able to click on a suggested search link (e.g., area 130, FIG. 1); or in the step 260, click on a "See also" link (e.g., area 140, FIG. 1); or in the step 270, visit a Web site (e.g., follow one of the links in area 150, FIG. 1). The step 240 loops back to the step 230, and the steps 250, 260, and optionally 270, all loop back 280 to the step 205. Alternatively, from the step 270, the user is able to proceed to the step 290, where the query completes.

Figure 3:
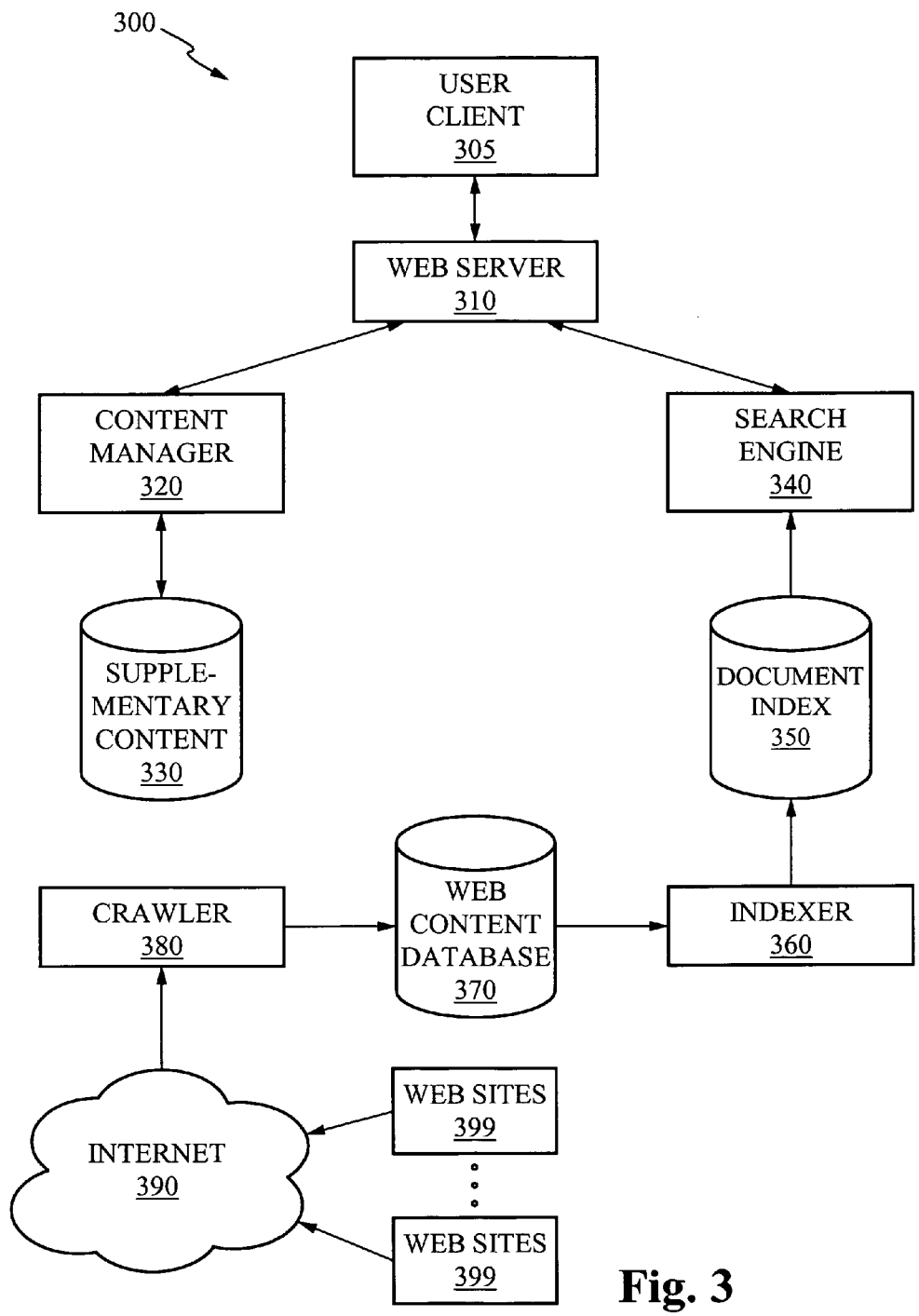
FIG. 3 is a schematic diagram illustrating the components of an Internet search application flow diagram in accordance with the present invention.

FIG. 3 illustrates the components of a system 300 in accordance with the present invention. The system 300 comprises a user client 305 that connects to a Web server 310. The Web server 310 is coupled to both a content manager 320 and a search engine 340. The content manager 320 is coupled to a data repository 330 for storing supplemental content. The search engine 340 is coupled to a data repository 350 containing document indices, which in turn is coupled to an indexer 360. The indexer 360 is coupled to a Web content database 370, which is coupled to a Web crawler 380. The Web crawler 380 is coupled to one or more Web sites 399 over the Internet 390.

In operation, the Web crawler 380 navigates over the Internet 390, visiting Web sites 399 and populating the Web content database 370. The indexer 360 uses the Web content database 370 to create the document index 350. When a user generates a query on the user host 305, the Web server 310 transmits the search request to the search engine 340. The search engine 340 determines which Web pages are probably most relevant to the query and, using the user generated feedback described above, creates the results list. The search engine 340 uses the user generated rankings to order the results list, as described above, and returns the results list to the user for display.

Also in response to the query, the content manager 320 retrieves supplemental information related to the query from the data repository 330, including concept descriptions, other-concept descriptions, "See also" links and related query terms. This information is displayed, for example, in areas 120, 130, 140 and 150, respectively, of FIG. 1. The content manager 320 also allows users to add, edit, or remove supplemental information. The Web server 310 combines the results from the search engine 340 with the information from the content manager 320 and returns the combination to the user. The content manager 320 determines whether the user changed supplemental information and, if so, stores it in the data repository 330. The new or updated information is now available to a later user running the same or similar search.

FIG. 4 illustrates the hardware components for an Internet search application system 400 for use by a user 405 in accordance with the present invention. The system 400 comprises a client device 410 coupled over the Internet 420 to a Web server 430. The client device 410 is any device used to access the Web server 430 and configured to communicate using Internet protocols such as, but not limited to, http (the Hypertext Transfer Protocol) and WAP (Wireless Application Protocol). Preferably, the client device 410 is a personal computer. Alternatively, the client device 410 is another device including, but not limited to, a hand held device such as a cell phone or personal digital assistant (PDA) capable of presenting information using standards such as HTML (the Hypertext Markup Language), HDML (Handheld Device Markup Language), WML (wireless markup language), or the like.

The Web server 430 is coupled to both a content server 440 and a search server 460. The content server 440 is coupled to a data store 450 and the search server 460 is coupled to a data store 470.

It will be readily apparent to one skilled in the art that other modification can be made to the embodiments without departing from the spirit and scope of the invention as defined by the appended claims.

We claim:

1. A method comprising:
   a) managing a database by an Internet search application in response to user input provided by one or more first users in response to one of visiting a Web site and performing a first search query, wherein the user input comprises relevance feedback;
   b) ranking documents for including in a results list in response to a search query, by a search engine, an order in which the documents are ranked being influenced by the user input; and
   c) presenting web page search results from the database in response to a second search query initiated by a second user different from the one or more first users, wherein the web page search results includes supplemental information related to the search query and a results list comprising a list of web pages related to the second search query, multiple users are able to modify the same portions of the supplemental information, which pages are presented and the order in which the web pages are presented are influenced by the relevance feedback received prior to the second search query, the relevance feedback is different from selection of a link to a web page in the results list, the supplemental information includes a user-entered description of a first concept related to the search query, and the user-entered description of the first concept contains one of a link to a description of a second concept related to the first concept or links to documents related to the first concept.

2. The method of claim 1, wherein managing the database comprises computing the influence that relevance feedback has on the ranking of elements in the results list prior to initiation of the search query by the second user.

3. The method of claim 1, wherein the relevance feedback comprises an indication to block one or more entries in the results list by selection of a blocking mechanism.

4. The method of claim 1, wherein the supplemental information includes at least one of a user-entered description of a first concept related to the search query or hyperlinks to documents related to the search query, wherein managing the database comprises any one of adding, editing, and deleting the description of the first concept or the hyperlinks.

5. The method of claim 1, wherein the supplemental information includes a list of different concepts related to the search query.

6. The method of claim 1, wherein the second concept is any one of a sub-category of the first concept, a co-occurrence of the first concept, and a concept whose occurrence is statistically related to occurrences of the first concept.

7. The method of claim 6, wherein a relationship between the first concept and the second concept is determined by selecting one of predetermined criteria, user-entered categories, and a statistical relationship.

8. The method of claim 1, wherein the supplemental information comprises a link for automatically executing a second search query related to the first search query.

9. The method of claim 8, wherein a term of the second search query is input by a user.

10. The method of claim 8, wherein a term of the second search query is determined by a computer.

11. The method of claim 10, wherein the computer-determined term is derived from any one of its co-occurrence in a document containing a term of the first search query, its location within a document containing a term of the first search query, and a density of its occurrences in a document containing a term of the first search query.

12. The method of claim 1, further comprising using a suspension criterion to suspend an ability of a user to provide relevance feedback.

13. The method of claim 1, wherein managing the database comprises computing the influence that relevance feedback has on the ranking of elements in the results list subsequent to initiation of the search query by the user.

14. The method of claim 1, wherein the order in which the web pages are to be initially presented in the results list in response to the search query initiated by the user is influenced by relevance feedback received in the context of a previous search query.

15. The method of claim 1, wherein the web pages are to be initially presented in the results list, and in which order the web pages are presented, in response to the search query initiated by the user is influenced by relevance feedback received in a context other than a previous search query.

16. The method of claim 1, wherein the relevance feedback comprises information related to relevancies of elements in the results list or an indication of the user=s assessment of the quality or interest of the web page corresponding to an entry in the results list.

17. The method of claim 16, wherein the indication of the user=s assessment of the quality or interest of the web page comprises either assigning a rating to the web page or indicating that the web page is more relevant or interesting, or less relevant or interesting.

18. The method of claim 1, wherein the supplemental information is presented separately from and independently of the entries in the results list.

19. The method of claim 1, wherein the supplemental information is input by a user.

20. The method of claim 1, wherein the supplemental information is determined by a computer.

21. The method of claim 1, wherein the Internet search application comprises a search engine and a content manager, wherein the content manager stores user input in the database, modifies user input in the database, deletes user input from the database, and any combination thereof.

22. A system comprising:
a) a Web server computer configured to present web page search results related to terms of a search query initiated by a user, wherein the web page search results include a results list comprising a list of web pages related to the terms of the search query, the order in which the web pages are presented in response to the search query being influenced by relevance feedback provided by multiple users prior to the search query, and wherein the relevance feedback is different from selection of a link to a web page in the results list;
b) a search engine for querying a database and providing the web page search results in response to user queries;
c) a content manager for managing the supplemental information in response to user input, wherein the user input comprises the relevance feedback; and
d) a first data store coupled to the content manager for storing supplemental information related to the search query, wherein the web page search results include the supplemental information, and multiple users are able to modify the same portions of the supplemental information, wherein after the second user modifies the supplemental information previously provided by a first user, any user, including the first user, is able to at least one of further modify the supplemental information or revert the modification of the second user.

23. The system of claim 22, wherein the supplemental information includes at least one of a user-entered description of a first concept related to the search query or hyperlinks to documents related to the search query, wherein the user-entered description or the hyperlinks are presented separately from and independently of the entries in the results list, and wherein managing the database comprises any one of adding, editing, and deleting the description of the first concept or the hyperlinks.

24. The system of claim 22, wherein the supplemental information includes a user-entered description of a first concept related to the search query, wherein the user-entered description of the first concept is presented separately from and independently of the entries in the results list, and wherein the user-entered description of the first concept contains one of a link to a description of a second concept related to the first concept or links to documents related to the first concept.

25. The system of claim 22, wherein the supplemental information includes a list of different concepts related to the search query.

26. The system of claim 22, wherein the content manager is configured to receive the user input to add, edit, or delete a link to a description of a second concept, and the description of the second concept is part of the supplemental information.

27. The system of claim 22, wherein the supplemental information comprises a user-entered description of a first concept and the content manager is configured to receive the user input to add, edit, or delete the description of the first concept.

28. The system of claim 22, further comprising an area that displays links for automatically executing a second search query related to the first search query.

29. The system of claim 22, wherein the order in which the web pages are to be initially presented in the results list in response to the search query initiated by the user is influenced by relevance feedback received in the context of a previous search query.

30. The system of claim 22, wherein the order in which the web pages are to be initially presented in the results list in response to the search query initiated by the user is influenced by relevance feedback received in a context other than a previous search query.

31. The system of claim 22, wherein the relevance feedback comprises an indication to block one or more entries in the results list by selection of a blocking mechanism.

32. The system of claim 22, wherein the Web server computer is configured to use a suspension criterion to suspend the ability of a user to provide relevance feedback.

33. The system of claim 22, wherein the supplemental information is displayed separately from and independently of the web pages in the web page results list and includes a user-entered description of a first concept related to the first search query.

34. The system of claim 22, wherein the supplemental information is read from a file.

35. The system of claim 22, wherein the relevance feedback comprises information related to relevancies of elements in the results list or an indication of the user=s assessment of the quality or interest of the web page corresponding to an entry in the results list.

36. A method comprising:
a) managing a database including user input, wherein the database comprises supplemental information, wherein the supplemental information includes at least one of a user-entered description of a first concept related to the search query or hyperlinks to documents related to the search query, and wherein managing the database comprises any one of adding, editing, and deleting the description of the first concept or the hyperlinks; and b) presenting web page search results from the database in response to a search query initiated by a user, wherein the web page search results includes a results list and the supplemental information related to the search query, wherein the results list comprises a list of web pages related to the search query, and wherein multiple users are able to modify the same portions of the supplemental information regardless of the original source of the supplemental information.

37. The method of claim 36, wherein the supplemental information is presented separately from and independently of the entries in the results list.

38. The method of claim 36, wherein the supplemental information includes a user-entered description of a first concept related to the search query.

39. The method of claim 38, wherein the user-entered description of the first concept contains one of a link to a description of a second concept related to the first concept or links to documents related to the first concept.

40. The method of claim 36, wherein the supplemental information includes a list of different concepts related to the search query.

41. The method of claim 36, wherein the order in which the web pages are initially presented is influenced by relevance feedback.

42. The method of claim 41, wherein the order in which the web pages are to be initially presented in the results list in response to the search query initiated by the user is influenced by relevance feedback received in the context of a previous search query.

43. The method of claim 41, wherein the order in which the web pages are to be initially presented in the results list in response to the search query initiated by the user is influenced by relevance feedback received in a context other than a previous search query.

44. A system comprising:

a) a Web server computer configured to present web page search results, wherein the web page search results include a results list and supplemental information related to terms of a search query initiated by a user, wherein the results list comprises a list of web pages related to the terms of the search query, and wherein multiple users are able to modify the same portions of the supplemental information regardless of the source of the supplemental information, wherein the supplemental information includes at least one of a user-entered description of a first concept related to the search query or hyperlinks to documents related to the search query, and wherein managing the database comprises any one of adding, editing, and deleting the description of the first concept or the hyperlinks;

b) a search engine for querying a database and providing the web page search results in response to user queries; and c) a content manager for managing the supplemental information in response to user input.

45. The system of claim 44, wherein the supplemental information is presented separately from and independently of the entries in the results list.

46. The system of claim 44, wherein the supplemental information includes a user-entered description of a first concept related to the search query.

47. The system of claim 46, wherein the user-entered description of the first concept contains one of a link to a description of a second concept related to the first concept or links to documents related to the first concept.

48. The system of claim 44, wherein the supplemental information includes a list of different concepts related to the search query.

49. The system of claim 44, wherein the order in which the web pages are initially presented is influenced by relevance feedback.

50. The system of claim 49, wherein the order in which the web pages are to be initially presented in the results list in response to the search query initiated by the user is influenced by relevance feedback received in the context of a previous search query.

51. The system of claim 49, wherein the order in which the web pages are to be initially presented in the results list in response to the search query initiated by the user is influenced by relevance feedback received in a context other than a previous search query.

* * * * *

UNITED STATES PATENT AND TRADEMARK OFFICE
CERTIFICATE OF CORRECTION

PATENT NO. : 9,092,523 B2  Page 1 of 1
APPLICATION NO. : 11/364617
DATED : July 28, 2015
INVENTOR(S) : Michael Tanne, Yunshan Lu and Bruce D. Karsh It is certified that error appears in the above-identified patent and that said Letters Patent is hereby corrected as shown below:

In the Claims

Column 11, at line 20 and at line 24, each occurrence of --user=s-- should read --user's--

Signed and Sealed this
Sixteenth Day of February, 2016

Michelle K. Lee
*Director of the United States Patent and Trademark Office*